(12) United States Patent
Kim et al.

(10) Patent No.: US 7,426,201 B2
(45) Date of Patent: Sep. 16, 2008

(54) APPARATUS AND METHOD FOR TRANSMITTING/RECEIVING A HIGH SPEED-SHARED CONTROL CHANNEL IN A HIGH SPEED DOWNLINK PACKET ACCESS COMMUNICATION SYSTEM

(75) Inventors: No-Sun Kim, Suwon-shi (KR); Yong-Suk Moon, Songnam-shi (KR); Hun-Kee Kim, Seoul (KR); Jae-Seung Yoon, Songnam-shi (KR); Jun-Sung Lee, Suwon-shi (KR)

(73) Assignee: Samsung Electroncis Co., Ltd (KR)

( * ) Notice: Subject to any disclaimer, the term of this patent is extended or adjusted under 35 U.S.C. 154(b) by 1028 days.

(21) Appl. No.: 10/331,839

(22) Filed: Dec. 30, 2002

(65) Prior Publication Data

US 2003/0123470 A1    Jul. 3, 2003

(30) Foreign Application Priority Data

Dec. 28, 2001    (KR)  ...................... 10-2001-0087296

(51) Int. Cl.
*H04Q 7/20*    (2006.01)

(52) U.S. Cl. .................. 370/335; 370/329; 370/342; 455/450

(58) Field of Classification Search ........................ None
See application file for complete search history.

(56) References Cited

U.S. PATENT DOCUMENTS

| 5,412,484 | A | * | 5/1995 | Yoshikawa | 382/246 |
|---|---|---|---|---|---|
| 6,026,097 | A | * | 2/2000 | Voois et al. | 370/468 |
| 6,044,073 | A | * | 3/2000 | Seshadri et al. | 370/342 |
| 6,092,187 | A | * | 7/2000 | Killian | 712/239 |
| 6,584,321 | B1 | * | 6/2003 | Coan et al. | 455/466 |
| 6,925,072 | B1 | * | 8/2005 | Grohn | 370/336 |
| 2003/0013447 | A1 | * | 1/2003 | Persson et al. | 455/437 |
| 2003/0039230 | A1 | * | 2/2003 | Ostman et al. | 370/335 |
| 2003/0079170 | A1 | * | 4/2003 | Stewart et al. | 714/755 |
| 2003/0081692 | A1 | * | 5/2003 | Kwan et al. | 375/295 |

* cited by examiner

*Primary Examiner*—Wing F. Chan
*Assistant Examiner*—Robert C Scheibel
(74) *Attorney, Agent, or Firm*—The Farrell Law Firm, PC

(57) ABSTRACT

An apparatus and method for transmitting/receiving an HS-SCCH in an HSDPA communication system including an HS-DSCH shared among a plurality of UEs and spread with a plurality of channelization codes, and the HS-SCCH for transmitting control information related with the HS-DSCH to enable the UEs to receive the shared channel. In the HS-SCCH transmitting apparatus, the control information is prioritized according to its processing urgency degree. High-priority control information and low-priority control information are generated and encoded in different encoding methods. Then the high-priority control information and the low-priority control information are multiplexed to a control channel signal such that the high-priority control information precedes the low-priority control information.

36 Claims, 11 Drawing Sheets

P_i : INDICATES SCCH-HS#1 (I∈{1,2,3,4})
P_0 : INDICATES THAT NO HS-SCCH CARRIES HS-DSCH-RELATED SIGNALLING INFORMATION TO THE UE

APPARATUS AND METHOD FOR TRANSMITTING/RECEIVING A HIGH SPEED-SHARED CONTROL CHANNEL IN A HIGH SPEED DOWNLINK PACKET ACCESS COMMUNICATION SYSTEM

PRIORITY

This application claims priority to an application entitled "Apparatus and Method for Transmitting/Receiving High Speed-Shared Control Channel in a High Speed Downlink Packet Access Communication System" filed in the Korean Industrial Property Office on Dec. 28, 2001 and assigned Ser. No. 2001-87296, the contents of which are hereby incorporated by reference.

BACKGROUND OF THE INVENTION

1. Field of the Invention

The present invention relates generally to an HSDPA (High Speed Downlink Packet Access) communication system, and in particular, to an apparatus and method for transmitting/receiving control information on a shared control channel.

2. Description of the Related Art

In its earlier developmental stage, a mobile communication system focused on voice service only. Now, user demands and advanced mobile communication technology have developed a high-speed, high-quality wireless packet communication system to provide data service and multimedia service. Major efforts to deploy a 2Mbps or higher-speed, high-quality wireless packet service in a third-generation mobile communication system involve ongoing standardization of HSDPA and 1xEV-DV (Evolution-Data and Voice) in the 3GPP ($3^{rd}$ Generation Partnership Project) and 3GPP2 ($3^{rd}$ Generation Partnership Project 2). A fourth-generation mobile communication system is being developed to provide higher-speed, higher-quality multimedia service.

As its name implies, HSDPA provides high-speed packet data service to terminals via an HS-DSCH (High Speed-Downlink Shared Channel) and related control channels. To support HSDPA, AMC (Adaptive Modulation and Encoding) and HARQ (Hybrid Automatic Retransmission Request) have been proposed.

AMC is a technique for adapting a modulation and coding format based on the received signal quality of a UE (User Equipment) and the channel condition between a particular Node B and the UE to increase the use efficiency of the entire cell. Therefore, a plurality of modulation and coding schemes (MCSs) are defined for AMC. MCS levels are defined from level 1 to level n. In other words, the AMC is an adaptive selection of an MCS level according to the channel condition between the UE and the serving Node B.

In AMC, an MCS is changed according to a down-link channel condition, which is represented usually as an SNR (Signal-to-Noise Ratio) of a received signal in the UE. The UE feeds back the SNR to the Node B on an up-link. The Node B then estimates the down-link channel condition and selects an appropriate MCS based on the estimation. Modulation schemes under consideration are QPSK (Quadrature Phase Shift Keying), 8PSK, 16QAM (Quadrature Amplitude Modulation), and 64QAM, and coding rates under consideration are ¼, ½, and ¾. The Node B selects a high-order modulation scheme (e.g., 16QAM and 64QAM) and-a high coding rate (e.g., ¾) for a UE near to the center of the BS, that is, a UE in a good channel condition, and a low-order modulation scheme and a low coding rate (e.g., ½) for a remote UE, that is, a UE in a bad channel condition. As compared to a conventional MCS determining method relying on high-speed power control, interference is reduced and thus system performance is improved.

HARQ is a link control scheme for retransmission of an initial packet having errors in order to compensate for the errors. HARQ techniques include CC (Chase Combining), FIR (Full Incremental Redundancy), and PIR (Partial Incremental Redundancy).

In CC, the same packet as an initial transmission packet is retransmitted. A receiver combines the retransmission packet with the initial transmission packet stored in a reception buffer, thus increasing the reliability of coded bits input to a decoder and achieving an overall system performance gain. Since combining the same two packets is similar in effect to repetition coding, an average of an about 3-dB performance gain increase results.

In FIR, instead of retransmitting the same packet as an initial transmission packet, a data packet having only redundancy bits generated in a channel encoder is transmitted at a retransmission. Since the decoder decodes using new redundancy bits as well as the initial transmission packet, decoding performance is increased.

As described above, to support HSDPA, new techniques such as AMC and HARQ must be provided and new control information must be exchanged between a UE and a Node B. The new control information is delivered on an HS-SCCH (High Speed-Shared Control Channel), which will be described with reference to FIG. 1.

FIG. 1 illustrates a structure of the HS-SCCH in a typical HSDPA communication system. Referring to FIG. 1, the HS-SCCH includes TFRI (Transport Format and Resource Related Information), CRC (Cyclic Redundancy Check), and HARQ Information. The HS-SCCH has a period of 2 ms because a data unit delivered on the HS-SCCH is 3 slots (i.e., 2 ms). That is, the HS-SCCH has a TTI (Transmission Time Interval) of 2 ms.

The HS-SCCH delivers the following control information:
1) HS-DSCH (High Speed-Downlink Shared Channel) channelization code;
2) Modulation scheme (MS);
3) Transport block set size (TBSS);
4) Transport channel identity (TrCH ID);
5) UE-specific CRC;
6) HARQ Process ID;
7) New data indicator (NDI); and
8) Redundancy version (RV).

MS, TBSS, TrCH ID, and HS-DSCH channelization code are referred to as "TFRI information". The TFRI information is delivered in the TFRI field. HARQ Process ID, RV, and NDI are referred to as "HARQ information" which is delivered in the HARQ field. The above control information will be described below in more detail.

(1) HS-DSCH Channelization Code

In the HSDPA communication system, down-link transmission resources are shared among a plurality of UEs. The down-link transmission resources include OVSF (Orthogonal Variable Spreading Factor) codes. It is under consideration to use 10, 12, or 15 OVSF codes when SF=16 and 20 OVSF codes when SF=32 in the HSDPA communication system. Assignment of OVSF codes in the HSDPA communication system will be described with reference to FIG. 2.

FIG. 2 illustrates an OVSF code tree with an SF of 16 in the typical HSDPA communication system. Referring to FIG. 2, each OVSF code is expressed as C(i, j) according to its position in the code tree. The variable i of C(i, j) represents the SF and the variable j represents the position of the OVSF code counted from the left, with the first position being numbered 0. For example, C(16, 0) indicates the first OVSF code from the left when SF=16. For an SF of 16, 10 OVSF codes C(16, 6) to C(16, 15) are assigned to the HSDPA communication system in FIG. 2. The 10 OVSF codes can be multiplexed for a plurality of UEs.

If there are HSDPA-supporting UEs A, B, and C, code multiplexing can be performed with 4 OVSF codes assigned to A, 5 OVSF codes to B, and the other one to C. Considering the amount of user data for each UE, a Node B determines the number of OVSF codes to be assigned to the UE and their positions in the OVSF code tree.

Use of 6 or 7 bits to represent information about channelization codes assigned to the HS-DSCH is under consideration in the present standardization work. For clarity of description, it is assumed that the HS-DSCH channelization code information is expressed in 7 bits.

(2) MS Information

As described before, a Node B selects an MCS adaptively according to a down-link channel condition between the Node B and a UE and tells the UE the MCS. Since the UE can determine the selected coding rate using TBSS, TrCH ID, HS-DSCH channelization ID, and MS, the Node B simply notifies the UE of the selected modulation scheme. In the following description, it is assumed that QPSK and 16QAM are available as modulation schemes and 1 bit is assigned to indicate the selected modulation scheme.

(3) TrCH ID

A transport channel is characterized by how information is transferred on a physical channel. In general, the transport channel is defined in terms of coding rate, channel encoding, transport block (TB) size, and the number of transmittable TBs during one TTI. If there are two different transport channels, it implies that they are different in terms of the above-described items. Because a plurality of transport channels can be time-division-multiplexed in an HS-PDSCH (High Speed-Physical Downlink Shared Channel), a UE must know which transport channel is active in the HS-PDSCH at a particular time. The transport channel is identified by its TrCH ID.

(4) TBSS

TBSS indicates the number of TBs transmitted during one TTI, so that a UE calculates the number of rate-matched bits in a physical layer. Rate matching refers to how repetition or puncturing is performed in the physical layer of a Node B. The rate matching and the TBSS are in such a relationship that the former is known from the latter. Therefore, a Node B does not transmit information about the rate matching to the UE. As described before, the TBSS is delivered in the TFRI field. Herein below, it is assumed that 6 bits are assigned to the TrCH ID and TBSS information.

(5) RV

If FIR is adopted as an HARQ technique, new redundancy bits are generated at a retransmission of an initial data packet. The Node B provides a redundancy bit combination indicator to the UE so that the UE can demodulate the data packet correctly. The redundancy bit combination indicator is an RV. It is assumed here that 4 puncturing patterns are available for redundancy bits and thus 2 bits are assigned to the RV.

(6) NDI and UE-Specific CRC

NDI indicates whether a data packet is initially transmitted or retransmitted. It is assumed that the NDI information is represented in one bit. UE-specific CRC makes a UE-specific ID more reliable. It is assumed that the UE-specific CRC is 12 or 16 bits. In the HS-SCCH slot format, the CRC field functions to check errors in the TFRI field, or in both the TFRI and HARQ Information fields.

(7) HARQ Process ID

Two techniques are used to increase HARQ efficiency. One is to exchange a retransmission request and a response for the retransmission request between the UE and the Node B, and the other is to temporarily store defective data and combine it with corresponding retransmitted data. In the HSDPA communication system, an n-channel SAW HARQ has been introduced to overcome the shortcomings of conventional SAW HARQ. In the conventional SAW HARQ, the next packet data is not transmitted until an ACK (Acknowledgement) signal is received for a current transmitted packet data. This implies that even though the next packet data can be transmitted, the ACK signal must be awaited. On the other hand, the n-channel SAW HARQ allows successive transmission of the next packet data without receiving an ACK signal for the current transmitted packet data, thereby increasing channel use efficiency. If n logical channels are established between a UE and a Node B and identified by specific time or their channel numbers, the UE can determine a channel on which a data packet has been transmitted at an arbitrary time point. The UE also can rearrange packet data in the right reception order or soft-combine corresponding packet data. A logical channel that delivers a particular packet is identified by an HARQ Process ID.

Table 1 below lists parameters delivered on the HS-SCCH and their sizes.

TABLE 1

| Parameter | Size (bits) |
| --- | --- |
| Channelization code set | 7 |
| MS | 1 |
| TrCH ID + TBSS | 6 |
| CRC | 16 |
| HARQ Process ID | 3 |
| NDI | 1 |
| RV | 2 |
| Total | 36 |

Now a description will be made of an HS-SCCH transmitter in the typical HSDPA communication system with reference to FIG. 3.

Referring to FIG. 3, before transmitting user data to a UE on an HS-DSCH, a Node B determines a channelization code 320 to be assigned to the user data through a code assigner 302, and an MS 318 and a coding rate through an MCS controller 304. Since the UE can determine the coding rate based on the MS 318, a TrCH ID & TBSS 310, and the channelization code 320, the Node B does not transmit information about the coding rate to the UE. An HARQ controller 306 determines an NDI 316, an HARQ Process ID 314, and an RV 312. A transport channel & block determiner 308 determines the TrCH ID & TBSS 310 for transmission of the user data.

A multiplexer (MUX) 322 multiplexes the channelization code 320, the MS 318, the NDI 316, the HARQ Process ID 314, the RV 312, and the TrCH ID & TBSS 310 to a bit stream in the HS-SCCH slot format. A CRC encoder 324 adds a CRC to the bit stream, and a serial-to-parallel converter (SPC) 326 converts the output of the CRC encoder 324 to an I bit stream and a Q bit stream.

Multipliers 328 and 329 multiply the I and Q bit streams by a predetermined spreading code $C_{OVSF}$, respectively. The multipliers 328 and 329 serve as spreaders. A multiplier 331 multiplies the output of the multiplier 329 by a signal component j. An adder 330 generates a complex signal by summing the outputs of the multipliers 328 and 331. A multiplier 332 multiplies the complex signal by a predetermined scrambling code $C_{SCRAMBLE}$. Thus the multiplier 332 serves as a scrambler. A multiplier 334 multiplies the scrambled signal by a channel gain. A modulator 336 modulates the output of the multiplier 334 in the determined modulation scheme. An RF (Radio Frequency) processor 338 converts the modulated signal to an RF signal and transmits the RF signal in the air through an antenna 340.

FIG. 4 is a block diagram of an HS-SCCH receiver in the typical HSDPA communication system. Referring to FIG. 4, an RF processor 404 converts an RF signal received from the air through an antenna 402 to a baseband signal. A demodulator 406 demodulates the baseband signal in a demodulation method in correspondence with a modulation scheme used in the Node B. A multiplier 408 multiplies the demodulated signal by the same scrambling code $C_{SCRAMBLE}$ as used in the Node B. The multiplier 408 serves as a descrambler.

A complex to I & Q stream unit 410 separates the descrambled signal into an I bit stream and a Q bit stream. Multipliers 412 and 414 multiply the I and Q bit streams by the same spreading code $C_{OVSF}$ as used in the Node B, respectively. The multipliers 412 and 414 serve as despreaders. A channel compensator 416 compensates for distortion possibly produced during signal transmission in the air.

A parallel-to-serial convert6er (PSC) 420 converts the channel-compensated signals to a serial signal. A CRC decoder 422 checks the CRC of the serial signal. If the signal is normal, the CRC decoder 422 feeds the signal to a demultiplexer (DEMUX) 424. The DEMUX 424 demultiplexes the CRC-checked signal into channelization code 426, MS 430, NDI 432, HARQ Process ID 434, RV 436, TrCH ID 438, and TBSS 440.

In the above-described HSDPA communication system, an initial transmission packet and a retransmission packet are transmitted with no distinction made between them. Control information about them is also transmitted in corresponding fields irrespective of initial transmission or retransmission, resulting in waste of radio resources. A puncturing pattern is preset for the initial transmission and thus there is no need for transmitting RV information to a UE at the initial transmission. The TrCH ID 438 and the TBSS 440 are not changed at the initial transmission and a retransmission. Therefore, it is unnecessary to transmit the TrCH ID and TBSS information at both the initial transmission and retransmission. It is because when an initial packet has errors, the packet is retransmitted on the same transport channel and the transport channel has the same TBSS. The indiscriminate data transmission wastes radio resources assigned to the control information. As a result, the overall system capacity is adversely affected. While the control information is delivered sequentially on the HS-SCCH at present, some control information may require processing with priority for demodulation of an HS-PDSCH signal related with the HS-SCCH signal. In this case, processing the HS-PDSCH signal might be delayed.

SUMMARY OF THE INVENTION

It is, therefore, an object of the present invention to provide an apparatus and method for transmitting minimum control information about data packet transmission in an HSDPA communication system.

It is another object of the present invention to provide an apparatus and method for minimizing an amount of control information to be transmitted on a shared control channel in an HSDPA communication system.

It is a further object of the present invention to provide an apparatus and method for transmitting minimum control information about data packet transmission depending on whether the packet transmission is an initial transmission or a retransmission in an HSDPA communication system.

It is still another object of the present invention to provide an apparatus and method for transmitting control information on a shared control channel according to its priority in an HSDPA communication system.

To achieve the above and other objects, according to one aspect of the present invention, in a control channel transmitting apparatus of a communication system including a shared channel, shared among a plurality of UEs and spread with a plurality of channelization codes, and a control channel for transmitting control information related with the shared channel to enable the UEs to receive the shared channel, a controller prioritizes the control information according to the processing urgency degree of the control information. A first control information generator generates high-priority control information under the control of the controller. A second control information generator generates low-priority control information under the control of the controller. A first encoder encodes the high-priority control information in a predetermined first encoding method. A second encoder encodes the low-priority control information in a predetermined second encoding method different from the first encoding method, and a MUX multiplexes the high-priority control information and the low-priority control information to a control channel signal such that the high-priority control information precedes the low-priority control information.

According to another aspect of the present invention, in a control channel receiving apparatus of a communication system including a shared channel, shared among a plurality of UEs and spread with a plurality of channelization codes, and a control channel for transmitting control information related with the shared channel to enable the UEs to receive the shared channel, a DEMUX receives a control channel signal and demultiplexes the control channel signal into high-priority control information and low-priority control information according to the processing urgency degrees of the control information under a predetermined control. A first decoder decodes the high-priority control information in a predetermined first decoding method. A second decoder decodes the low-priority control information in a predetermined second decoding method different from the first decoding method, and a controller controls the high-priority control information to be demodulated earlier than the low-priority control information.

According to a further aspect of the present invention, in a control channel transmitting method for a communication system including a shared channel shared among a plurality of UEs and spread with a plurality of channelization codes, and a control channel for transmitting control information related with the shared channel to enable the UEs to receive the shared channel, the control information is prioritized according to a processing urgency degree of the control information. High-priority control information is generated and encoded in a predetermined first encoding method. Low-priority control information is generated and encoded in a predetermined second encoding method different from the first encoding method, and the high-priority control information and the low-priority control information are multiplexed to a control channel signal such that the high-priority control information precedes the low-priority control information.

According to still another aspect of the present invention, in a control channel receiving method for a communication system including a shared channel, shared among a plurality of UEs and spread with a plurality of channelization codes, and a control channel for transmitting control information related with the shared channel to enable the UEs to receive the shared channel. A received control channel signal is demultiplexed into high-priority control information and low-priority control information according to the processing urgency degrees of the control information under a predetermined control. The high-priority control information is decoded in a predetermined first decoding method, and then the low-priority control information is decoded in a predetermined second decoding method different from the first decoding method.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Preferred embodiments of the present invention will be described herein below with reference to the accompanying drawings. In the following description, well-known functions or constructions are not described in detail since they would obscure the invention in unnecessary detail.

Figure 1:
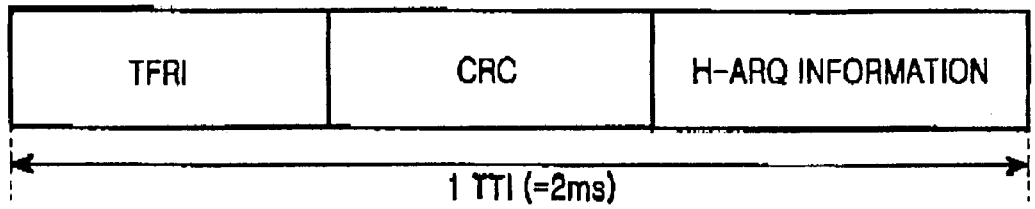
FIG. 1 illustrates an HS-SCCH slot format in a conventional HSDPA communication system.
Figure 2:
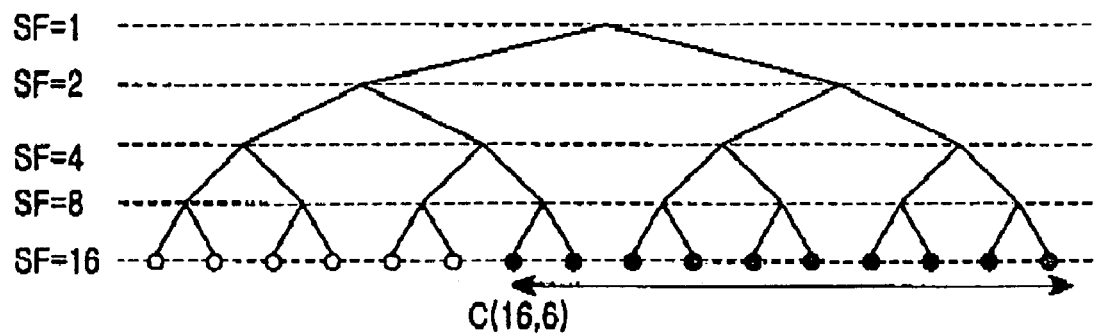
FIG. 2 illustrates an exemplary OVSF code tree for the conventional HSDPA communication system.
Figure 3:
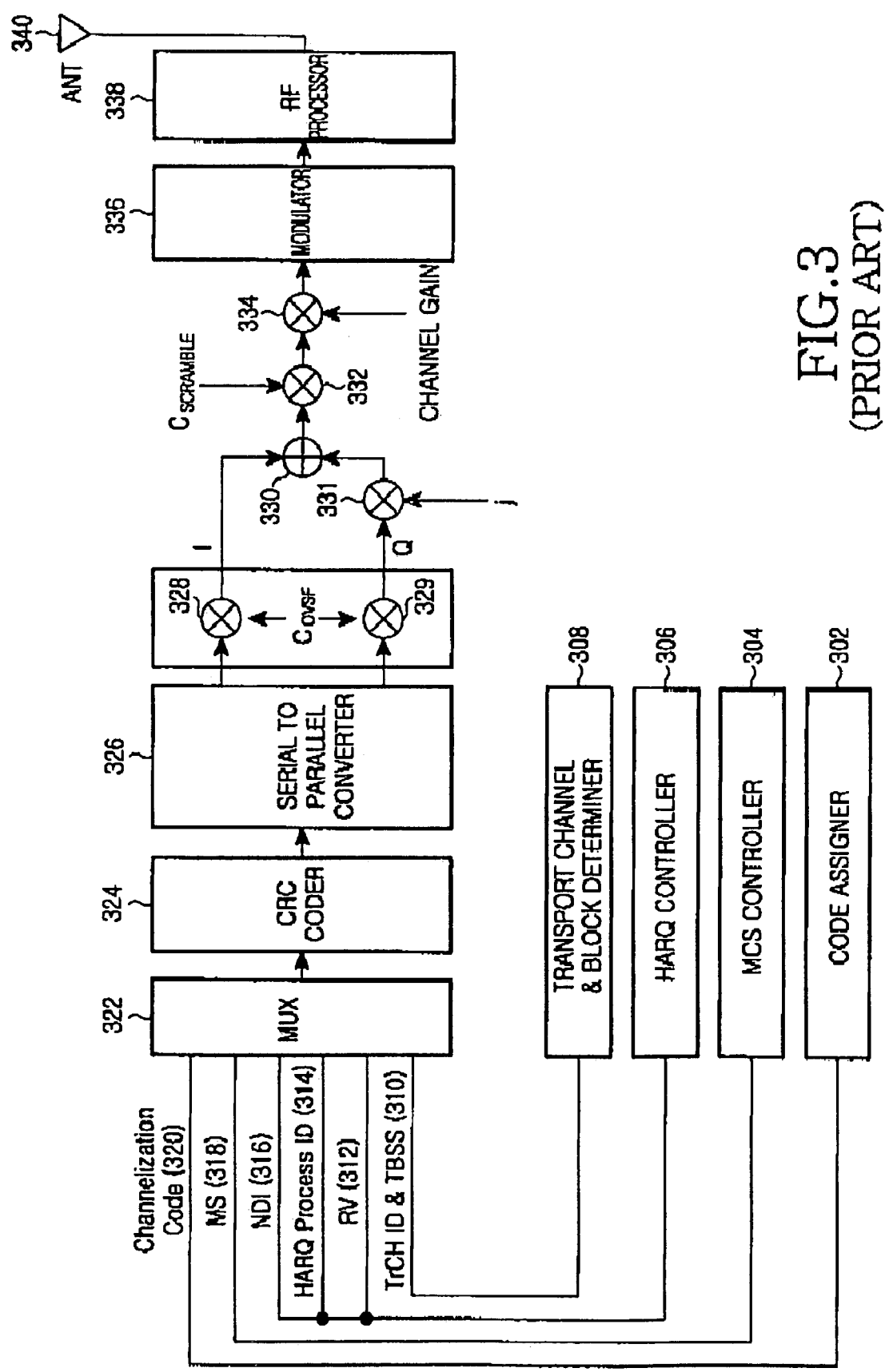
FIG. 3 is a block diagram of an HS-SCCH transmitter in the conventional HSDPA communication system.
Figure 4:
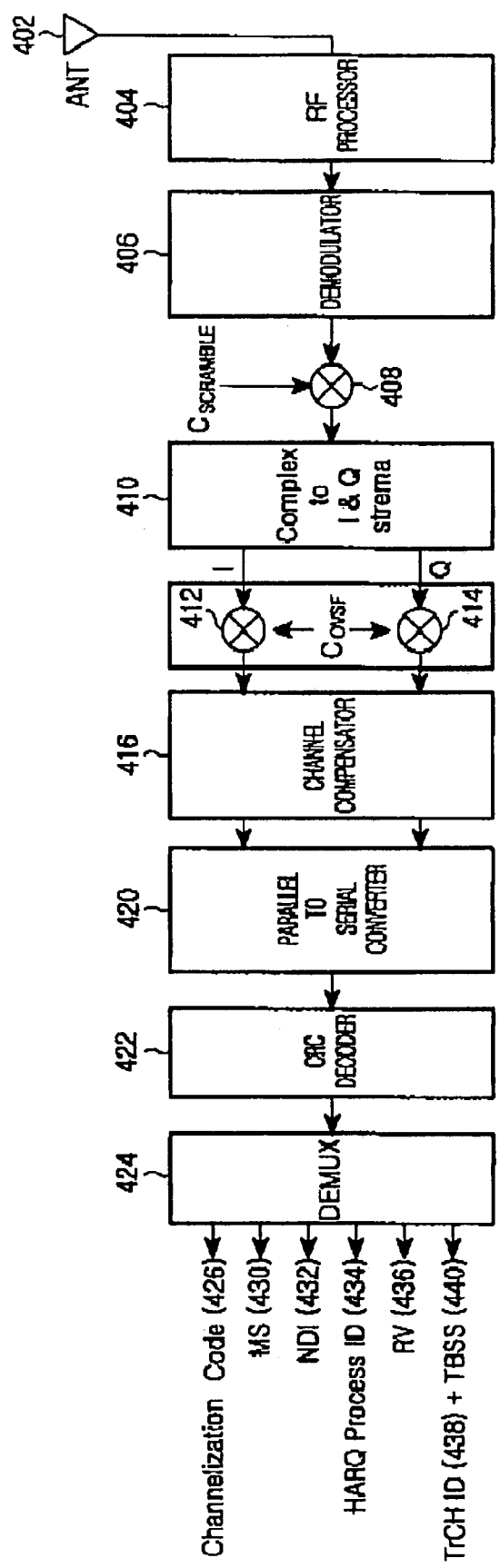
FIG. 4 is a block diagram of an HS-SCCH receiver in the conventional HSDPA communication system.
Figure 5:
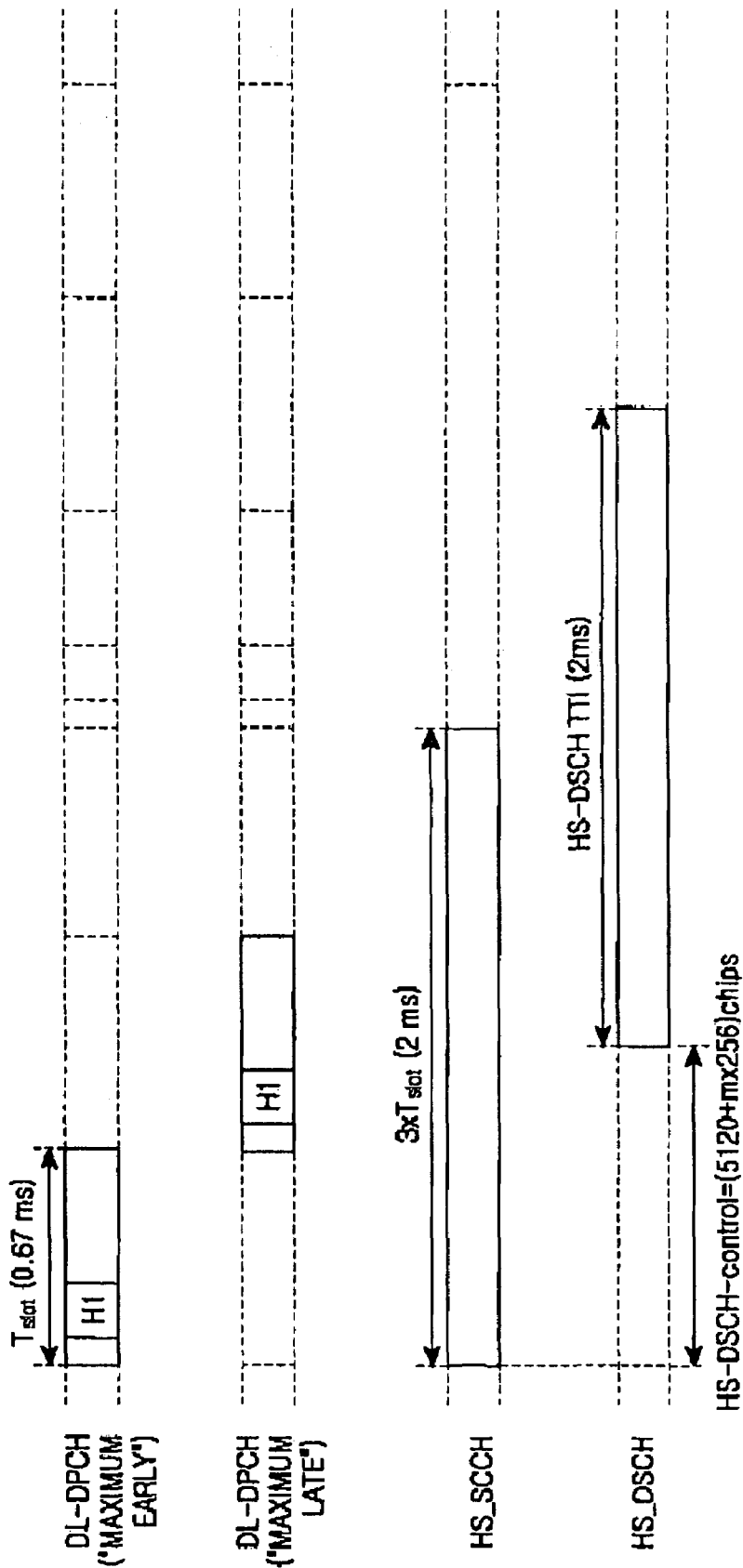
FIG. 5 illustrates downlink channels in the conventional HSDPA communication system.

FIG. 5 illustrates downlink channels in an HSDPA communication system, for example, Release 5. Referring to FIG. 5, the downlink channels for Release 5 are the DL-DPCH (Downlink-Dedicated Physical Channel), the HS-SCCH, and the HS-DSCH.

In addition to fields for supporting voice service in an existing non-HSDPA communication system, for example, Release 99, the DL-DPCH has a novel field, HI (HS-DSCH Indicator) to indicate whether a UE is to receive an HSDPA data packet on the HS-DSCH. If the UE is to receive the HSDPA data packet, the HI may additionally provide the channelization code of an HS-SCCH having control information about the HSDPA packet data. Although part of HS-DSCH control information can be transmitted on the DL-DPCH, the HI usually indicates the HS-SCCH for the UE to receive. If the UE is to receive an HSDPA packet, the HI is set to indicate the existence of the HSDPA packet. On the other hand, in the absence of an HSDPA packet directed to the UE, the HI is processed in DTX (Discontinuous Transmission), that is, the HI is not transmitted.

A Node B can establish up to 4 HS-SCCHs. To provide information about the presence or absence of an HSDPA data packet for a particular UE and information indicating an HS-SCCH that delivers control information about the HSDPA data packet, 2 bits are assigned to the HI. The control information of the HI will be described later with reference to FIG. 6.

As illustrated in FIG. 5, one DL-DPCH time slot is 0.67 ms and an HS-SCCH TTI is 3 slots (2 ms). An HS-DSCH TTI is also 2 ms and the HS-DSCH is transmitted a predetermined time after the HS-SCCH, enabling the UE to receive HS-DSCH control information on the HS-SCCH before receiving the HS-DSCH.

Figure 6:
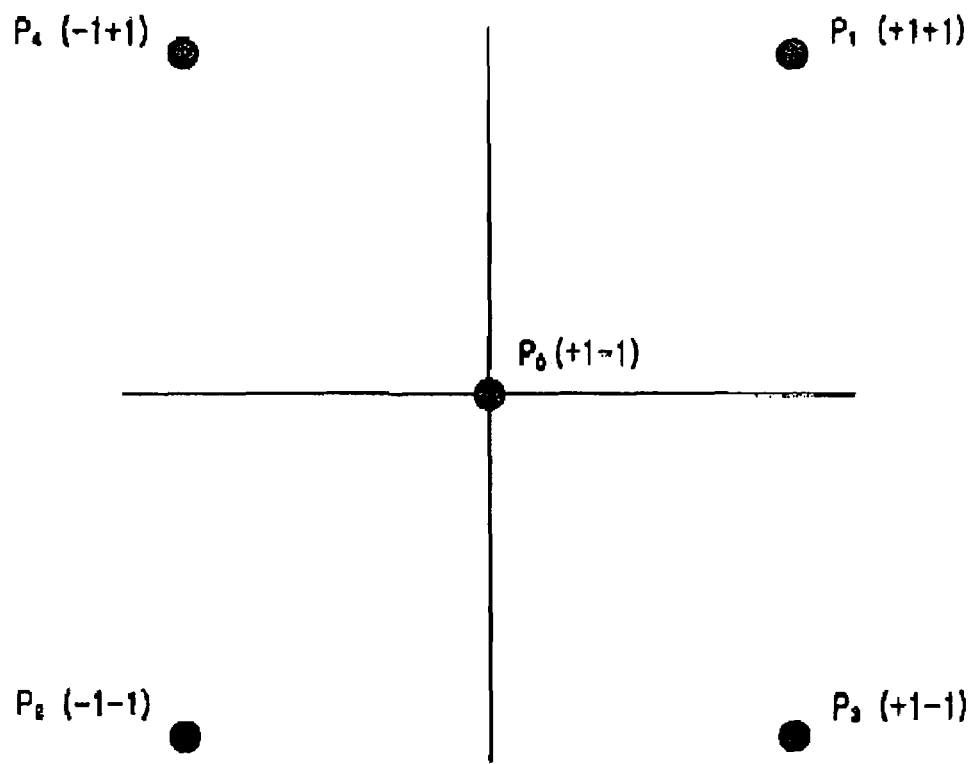
FIG. 6 illustrates HI (HS-SCCH Indicator) information in the conventional HSDPA communication system.

FIG. 6 illustrates HI information in the HSDPA communication system. Referring to FIG. 6, the HI indicates an HS-SCCH directed to a particular UE in 2 bits. For example, if 4 HS-SCCHs are available in the HSDPA communication system, they are numbered correspondingly. Since 2 bits are assigned to the HI, the numbers of the HS-SCCHs are in a one-to-one correspondence with HI values. As illustrated in FIG. 6, if the HI is absent, it indicates that there is no HSDPA data packet for the UE. If the HI is 00, it indicates a first HS-SCCH, if the HI is 11, it indicates a second HS-SCCH. If the HI is 01, it indicates a third HS-SCCH, and if the HI is 10, it indicates a fourth HS-SCCH. Consequently, five pieces of information can be represented with the 2-bit HI.

Upon receipt of the DL-DPCH, the UE demodulates information bits in the HI field. If the information bits have been processed in DTX, the UE determines that it is not to receive an HSDPA packet and waits until the next TTI, continuously monitoring the DL-DPCH. On the other hand, if the information bits indicate a particular value, the UE receives an HS-SCCH signal indicated by the value. The UE then detects control information required to demodulate an HS-DSCH signal, that is, information about the channelization code, MS, TBSS, TrCH ID, CRC, and HARQ Process ID of the HS-DSCH. Finally, the UE demodulates the HS-DSCH signal using the control information and thus detects the HSDPA data packet. As illustrated in FIG. 5, the UE receives the DL-DPCH and the HS-SCCH before receiving the HS-DSCH signal. Therefore, the Node B controls the start of transmission of the DL-DPCH and the HS-SCCH to precede the start of transmission of the HS-DSCH.

Figure 7:
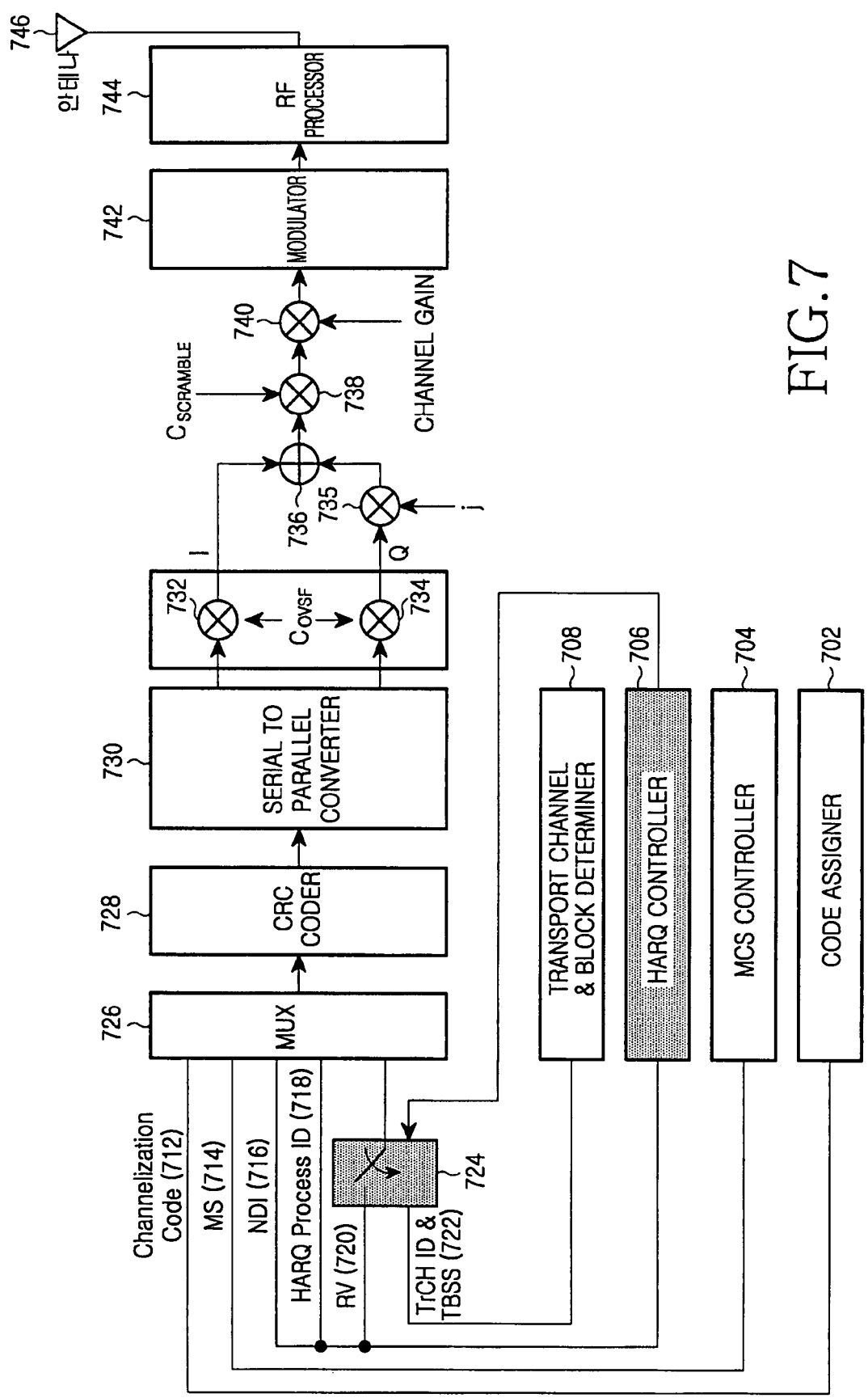
FIG. 7 is a block diagram of an HS-SCCH transmitter in an HSDPA communication system according to an embodiment of the present invention.

FIG. 7 is a block diagram of an HS-SCCH transmitter in an HSDPA communication system according to an embodiment of the present invention. Referring to FIG. 7, before transmitting user data to a UE on an HS-DSCH, a Node B determines a channelization code 712 to be assigned to the user data through a code assigner 702, and an MS 714 and a coding rate through an MCS controller 704. Since the UE can determine the coding rate based on the MS 714, a TrCH ID & TBSS 722, and the channelization code 712, the Node B does not transmit information about the coding rate to the UE. An HARQ controller 706 determines an NDI 716, an HARQ Process ID 718, and an RV 720. A transport channel & block determiner 708 determines the TrCH ID & TBSS 722 for transmission of the user data.

Simultaneously with the determination of the NDI 716, the HARQ controller 706 determines whether to transmit the RV 720 or the TrCH ID & TBSS 722. The NDI 716 indicates to the UE whether an HSDPA data packet is initially transmitted or retransmitted. At an initial transmission, that is, when the NDI 716 is N(1: true), the HARQ controller 706 determines to transmit the TrCH ID & TBSS 722 in a common field of the HS-SCCH. At a retransmission, that is, when the NDI 716 is C(0: false), the HARQ controller 706 determines to transmit the RV 720 in the common field of the HS-SCCH. Then, the HARQ controller 706 controls a switch 724 to switch to the determined control information. The common field containing the RV 720 or the TrCH ID & TBSS 722 is a novel field proposed in the present invention and will be described later with reference to FIGS. 8A, 8B, and 8C.

A MUX 726 multiplexes the channelization code information 712, the MS 714, the NDI 716, the HARQ Process ID 718, and the RV 720 or TrCH ID & TBSS 722 to a bit stream in the HS-SCCH slot format. A CRC encoder 728 adds a CRC to the bit stream, and an SPC 730 converts the output of the CRC encoder 728 to an I bit stream and a Q bit stream.

Multipliers 732 and 734 multiply the I and Q bit streams by a predetermined spreading code $C_{OVSF}$, respectively. The multipliers 732 and 734 serve as spreaders. A multiplier 735 multiplies the output of the multiplier 734 by a signal component j. An adder 736 generates a complex signal by summing the outputs of the multipliers 732 and 735. A multiplier 738 multiplies the complex signal by a predetermined scrambling code $C_{SCRAMBLE}$. Thus the multiplier 738 serves as a scrambler. A multiplier 740 multiplies the scrambled signal by a channel gain. A modulator 742 modulates the output of the multiplier 740 in the determined modulation scheme. An RF processor 744 converts the modulated signal to an RF signal and transmits the RF signal in the air through an antenna 746.

Figure 8A:
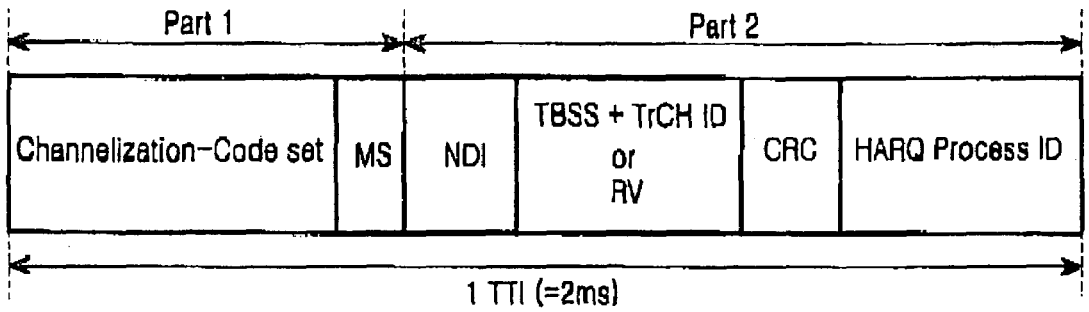
FIGS. 8A, 8B, and 8C illustrate embodiments of an HS-SCCH in the HSDPA communication system according to the present invention.
Figure 8B:
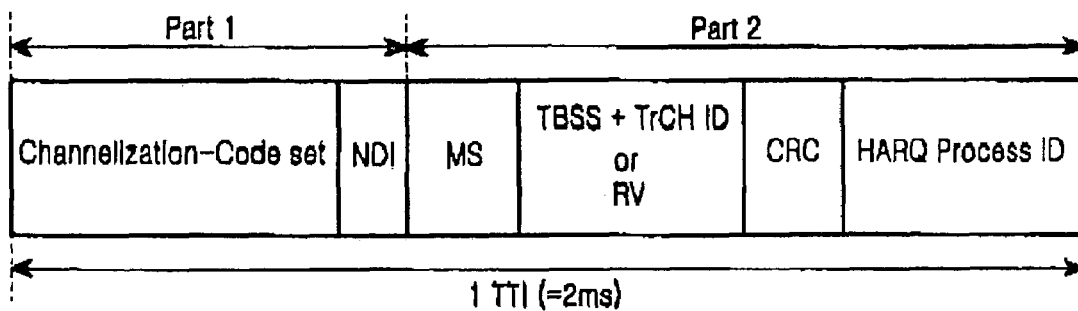
Figure 8C:
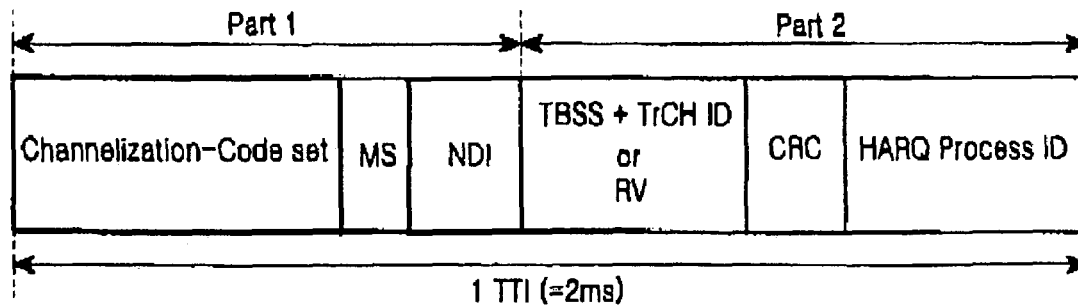

FIGS. 8A, 8B, and 8C illustrate embodiments of an HS-SCCH in the HSDPA communication system.

Referring to FIG. 8A, the HS-SCCH is divided into two parts, i.e., part 1 and part 2. Part 1 delivers information about a channelization code set and an MS, and part 2 delivers information about an NDI, a TrCH ID &TBSS or RV, a CRC, and an HARQ Process ID. The field including the TrCH ID &TBSS or RV is defined as a common field. The channelization code set and the MS precede the other control information on the HS-SCCH because the control information of the HS-SCCH is used to extract an HSDPA data packet from a demodulated HS-DSCH DSCH signal and thus the channelization code and MS information is required first. Therefore, the control information of the HS-SCCH is classified into two parts according to its priority. According to the present invention, the control information of the HS-SCCH is prioritized according to its degree of processing urgency and high-priority control information is put in the first place, so that the UE processes the HS-DSCH more efficiently based on the control information of the HS-SCCH. Arrangement of control information according to its priority implies that different coding schemes are applied to control information with different priority levels. This is well known and its description is not provided here.

It is determined from the NDI preceding the common field whether the common field contains the TrCH ID & TBSS or the RV. If the NDI is N(1: true), indicating initial transmission, the common field delivers the TrCH ID & TBSS, and if the NDI is C(0: false), indicating retransmission, the common field delivers the RV.

Referring to FIG. 8B, since the MS is low in its processing urgency degree, the NDI and the MS are exchanged in position. Therefore, the UE determines earlier whether control information in part 2 relates with initial transmission or retransmission. In this HS-SCCH structure, control information requiring earlier processing can be transmitted in part 1.

Referring to FIG. 8C, the channelization code set, the MS, and the NDI are placed in part 1. Thus a modulation delay is prevented and it is determined earlier whether control information in part 2 relates with initial transmission or retransmission. As stated before, arrangement of the control information is system implementation-dependent and the following description is made in the context of the HS-SCCH structure illustrated in FIG. 8A by way of example.

Figure 9:
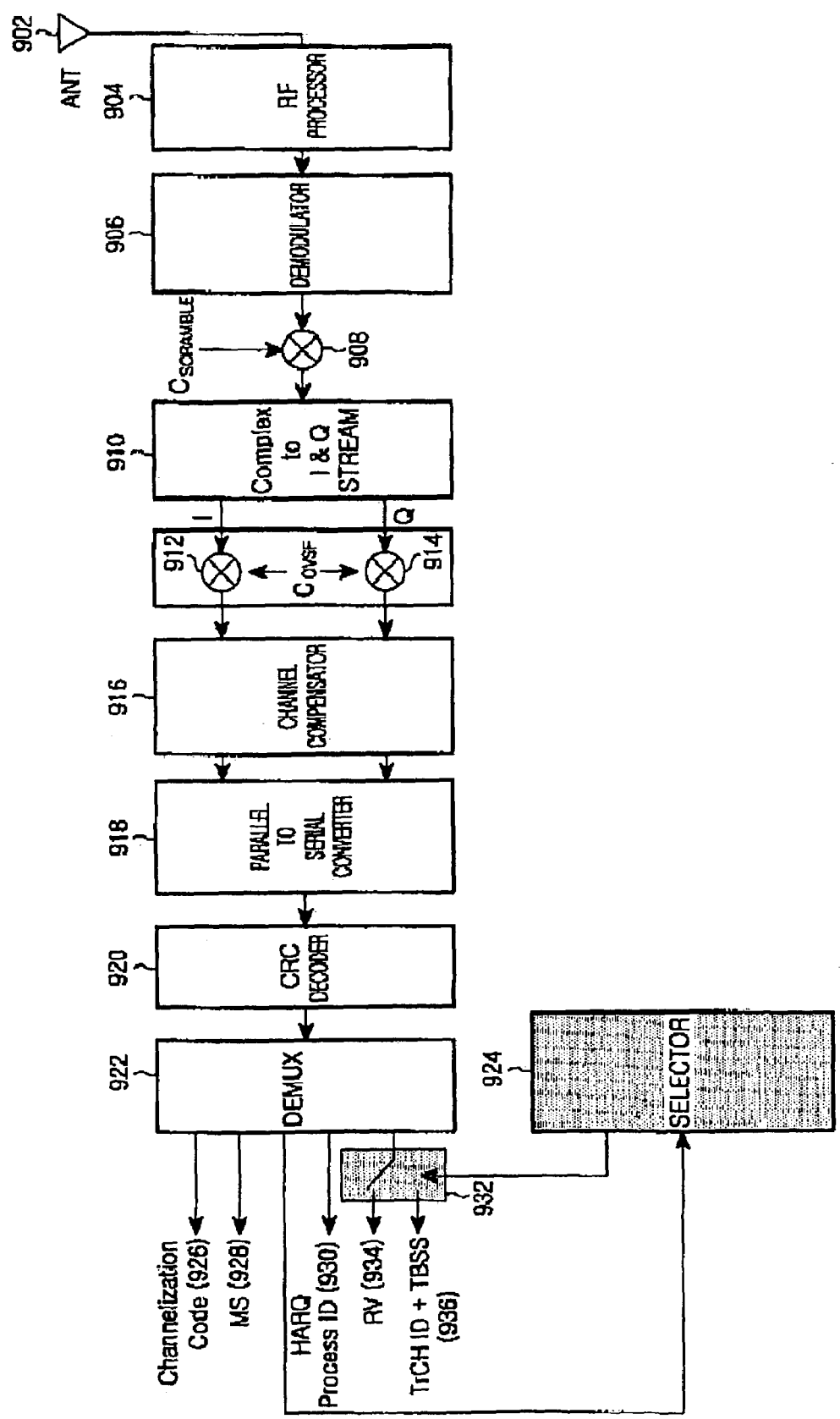
FIG. 9 is a block diagram of an HS-SCCH receiver in the HSDPA communication system according to the embodiment of the present invention.

FIG. 9 is a block diagram of an HS-SCCH receiver in the HSDPA communication system according to the embodiment of the present invention. Referring to FIG. 9, an RF processor 904 converts an RF signal received from the air through an antenna 902 to a baseband signal. A demodulator 906 demodulates the baseband signal in a demodulation method in correspondence with a modulation scheme used in a transmitter of a Node B. A multiplier 908 multiplies the demodulated signal by the same scrambling code $C_{SCRAMBLE}$ as used in the Node B. The multiplier 908 serves as a descrambler.

A complex to I & Q stream unit 910 separates the descrambled signal into an I bit stream and a Q bit stream. Multipliers 912 and 914 multiply the I and Q bit streams by the same spreading code $C_{OVSF}$ as used in the Node B, respectively. The multipliers 912 and 914 serve as despreaders. A channel compensator 916 compensates for distortion possibly produced during signal transmission in the air.

A PSC 918 converts the channel-compensated signals to a serial signal. A CRC decoder 920 checks the CRC of the serial signal. If the signal is normal, the CRC decoder 920 feeds the signal to a DEMUX 922. The DEMUX 922 demultiplexes the CRC-checked signal into channelization code information 926, MS 928, NDI 938, an HARQ Process ID 930, and an RV 934 or a TrCH ID & TBSS 936. The NDI 938 output from the DEMUX 922 is fed to a selector 924. If the NDI 938 is N(1: true), the selector 924 determines that a data packet directed to a corresponding UE is an initial transmission packet, and controls a switch 932 to switch to the TrCH ID & TBSS 936. If the NDI 938 is C(0: false), the selector 924 determines that the data packet directed to the UE is a re transmission packet, and controls the switch 932 to switch to the RV 934.

Figure 10:
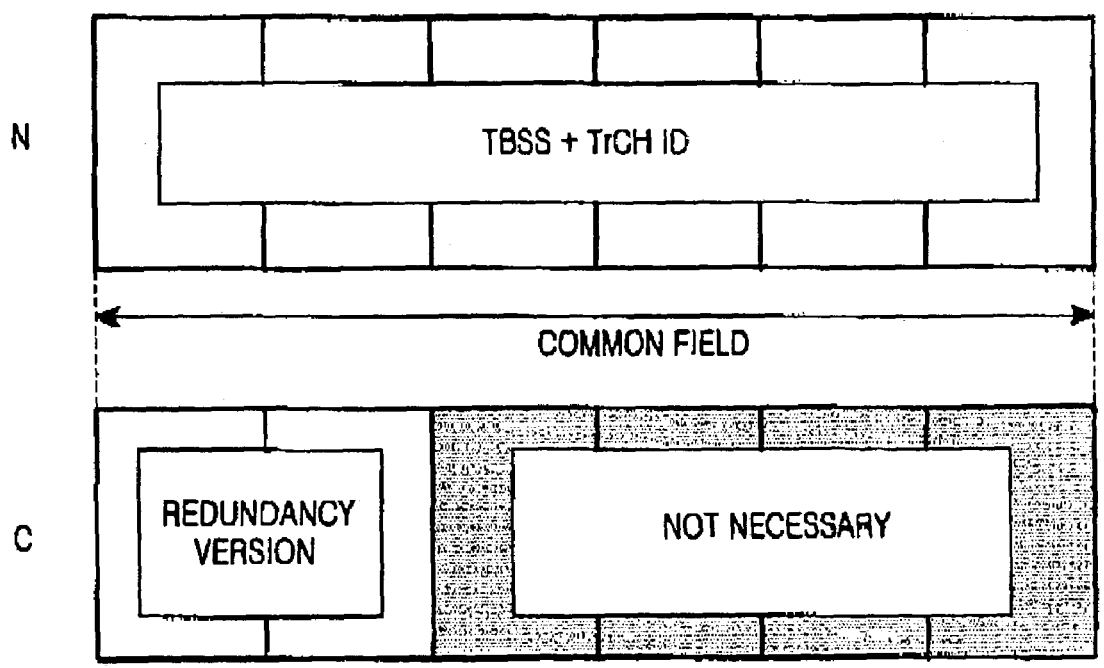
FIG. 10 schematically illustrates a common field illustrated in FIG. 8A.

FIG. 10 schematically illustrates the structure of the common field illustrated in FIG. 8A. Referring to FIG. 10, if N bits are used to deliver a TrCH ID & TBSS and M bits are used to deliver an RV (generally N>M), (N−M) bits are unused at a retransmission of an HSDPA data packet because the TrCH ID & TBSS is transmitted at an initial transmission and the RV is transmitted at the retransmission. The (N−M) bits can be utilized as radio resources for various purposes: (1) to additionally transmit control information of another field, that is, for double transmission of the control information, (2) to increase demodulation performance by bit insertion; (3) to be DTX-processed; and (4) to be inserted as dummy bits.

As described above, different control information (i.e., RV or TrCH ID & TBSS) is transmitted depending on whether a data packet is initially transmitted or retransmitted, thereby saving information bits assigned to the RV or TrCH ID & TBSS. To do so, one common field is defined to deliver the RV or TrCH ID & TBSS.

Table 2 below lists parameters delivered on the HS-SCCH having the slot format illustrated in FIG. 8A and their sizes.

TABLE 2

| Parameter | Size (bits) |
|---|---|
| Channelization Code Set | 7 |
| MS | 1 |
| TrCH ID + TBSS Or RV | 6 |
| CRC | 16 |
| HARQ Process ID | 3 |
| NDI | 1 |
| Total | 34 |

As compared to Table 1 illustrating parameters and their sizes in the conventional HS-SCCH, the HS-SCCH illustrated in Table 2 requires 34 bits, 2 bits less than the conventional HS-SCCH. Since only the 2-bit RV is transmitted at a retransmission of a data packet, 4 bits are saved from the 6-bit common field. In the 4 bits, control information of another field requiring more reliable transmission than any other control information can be transmitted, or a value preset between a UE and a Node B can be inserted, thereby achieving the additional benefit of an increased demodulation probability. The 36 information bits of the conventional HS-SCCH are reduced to 30 information bits in the HS-SCCH of the present invention when a data packet is retransmitted.

Figure 11:
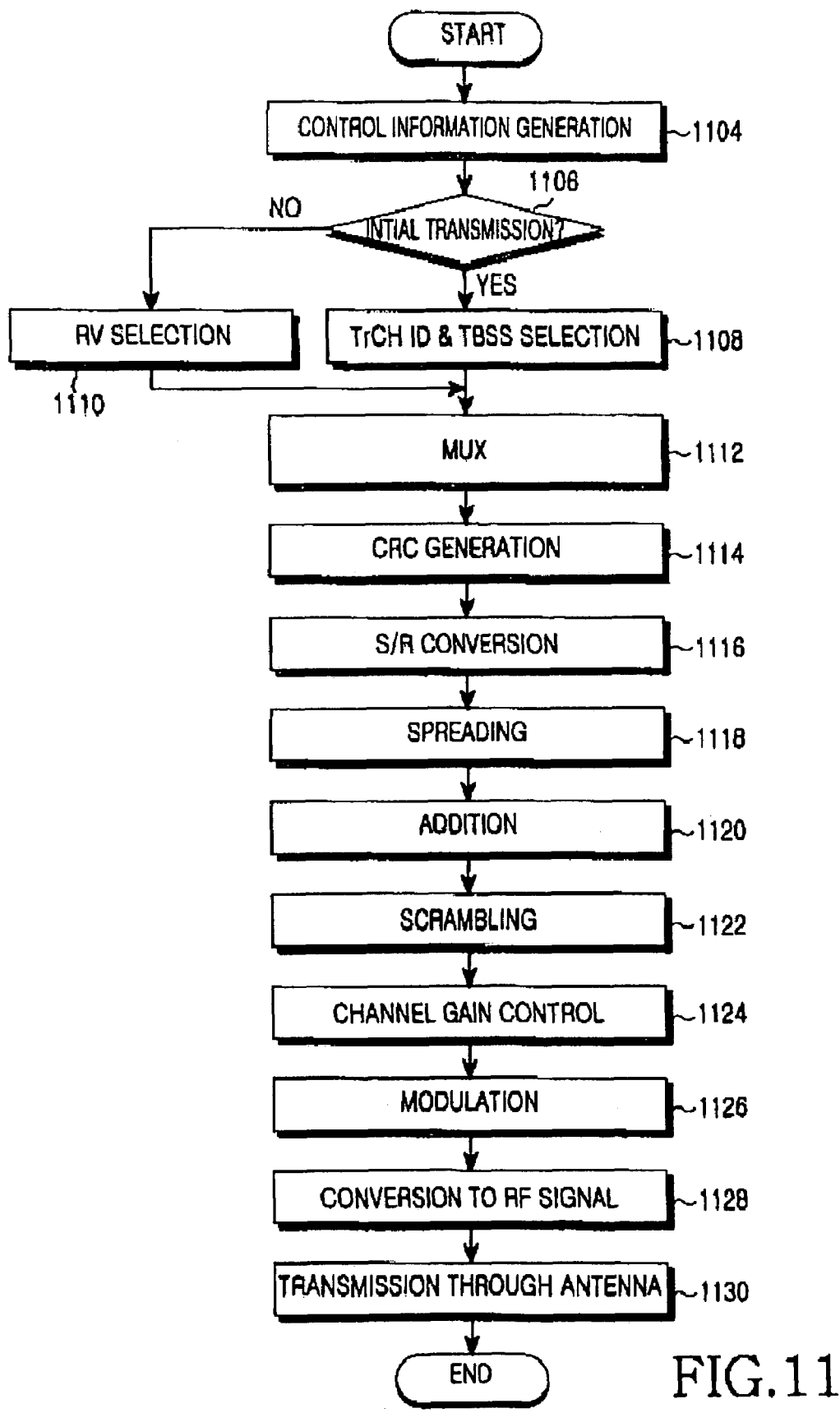
FIG. 11 is a flowchart illustrating an HS-SCCH transmitting operation in the HS-SCCH transmitter illustrated in FIG. 7.

FIG. 11 is a flowchart illustrating an HS-SCCH transmitting operation in the HS-SCCH transmitter illustrated in FIG. 7. Referring to FIG. 11, a Node B generates control information about user data for a particular UE before transmitting the user data to the UE on an HS-DSCH in step 1104. The control information includes information about a channelization code, an MS, an NDI, an HARQ Process ID, an RV, and a TrCH ID & TBSS. In step 1106, the Node B determines whether the data packet is initially transmitted or retransmitted. In the case of an initial transmission, the Node B selects the TrCH ID & TBSS information for a common field of an HS-SCCH in step 1108. On the other hand, in the case of a retransmission, the Node B selects the RV information for the common field in step 1110.

The Node B then multiplexes the control information to a bit stream in an HS-SCCH slot format in step 1112 and adds a CRC to the multiplexed bit stream in step 1114. In step 1116, the Node B converts the CRC-attached serial it stream to parallel I and Q bit streams. The Node B spreads the I and Q bit streams with a predetermined spreading code in step 1118 and generates a complex signal by adding them in step 1120.

The Node B scrambles the complex signal with a predetermined scrambling code in step 1122 and multiplies the scrambled signal by a predetermined channel gain in step 1124. In step 1126, the Node B modulates the gain-controlled signal in a predetermined modulation scheme. Then the Node B converts the modulated signal to an RF signal in step 1128 and transmits the RF signal in the air through an antenna in step 1130.

Figure 12:
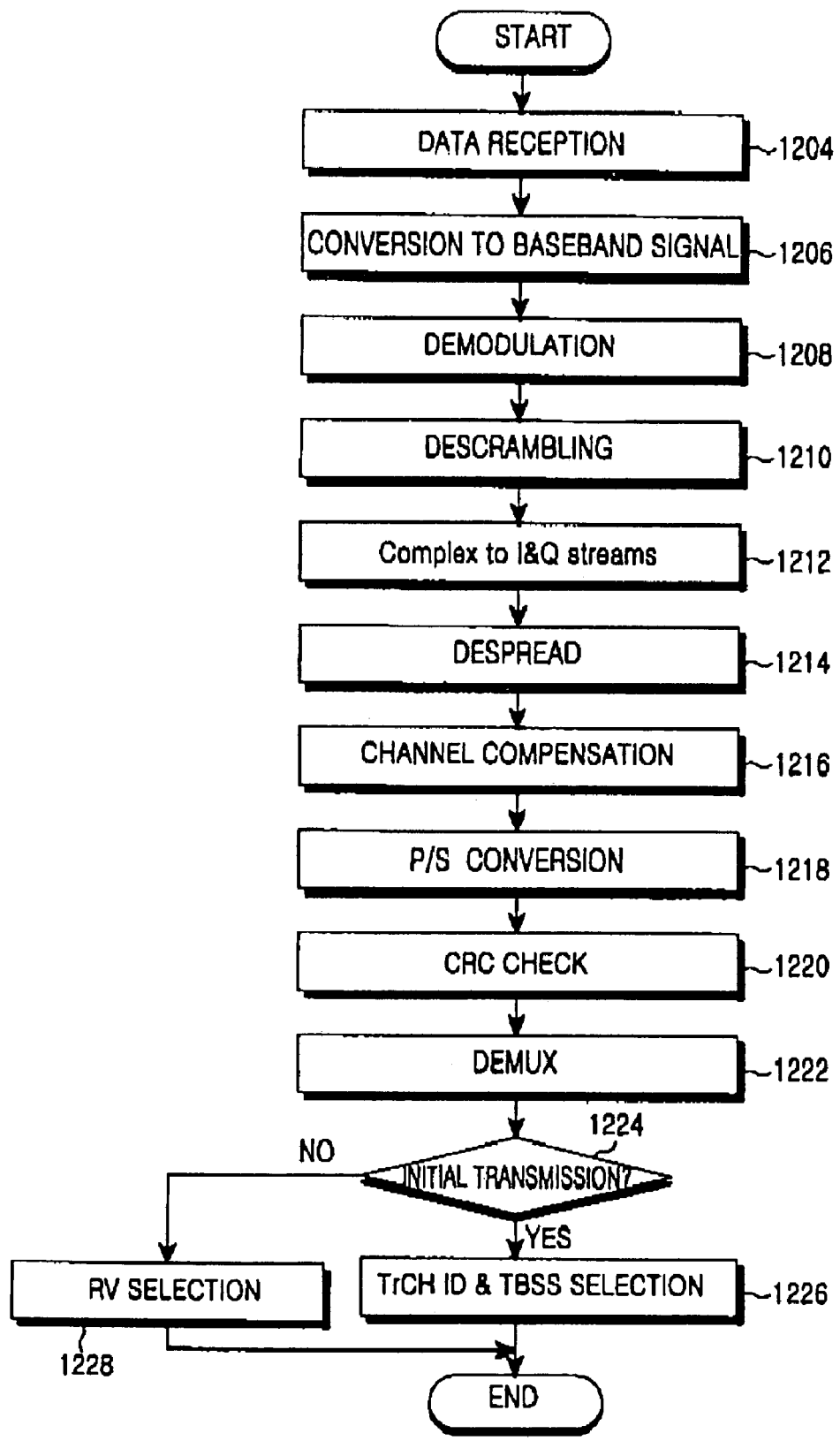
FIG. 12 is a flowchart illustrating an HS-SCCH receiving operation in the HS-SCCH receiver illustrated in FIG. 9.

FIG. 12 is a flowchart illustrating an HS-SCCH receiving operation in the HS-SCCH receiver illustrated in FIG. 9. Referring to FIG. 12, a UE receives data from the air through antenna in step 1204, converts the data to a baseband signal in step 1206, and demodulates the baseband signal in a demodulation method corresponding to a modulation scheme used in a transmitter of a Node B in step 1208. In step 1210, the UE descrambles the demodulated signal with the same scrambling code as used in the Node B. The UE separates the descrambled signal into I and Q bit streams in step 1212 and despreads the I and Q bit streams with the same spreading code as used in the Node B in step 1214.

The UE channel-compensates the despread I and Q bit streams in step 1216, converts the I and Q bit streams to a serial bit stream in step 1218, and CRC-checks the serial bit stream in step 1220. If the bit stream is normal, the UE demultiplexes the CRC-checked signal to control information in step 1222. The control information includes information about a channelization code, an MS, an NDI, an HARQ Process ID, an RV, and a TrCH ID & TBSS.

In step 1224, the UE determines whether the NDI indicates an initial transmission or a retransmission. If the NDI is N(1: true), indicating the initial transmission, the UE outputs information in a common field of the HS-SCCH as the RV information in step 1226. If the NDI is C(0: false), indicating the retransmission, the UE outputs information in the common field as the TrCH & TBSS information in step 1228.

In accordance with the present invention, different control information is transmitted on an HS-SCCH depending on whether an HSDPA data packet is initially transmitted or retransmitted in an HSDPA communication system. The resulting minimization of radio resource consumption for the control information increases the entire system capacity.

Information bits required for the control information are minimized as compared to the number of information bits of the conventional HS-SCCH. The resulting available bits can be utilized for double transmission of high-priority control information, thereby increasing system reliability.

The control information is prioritized according to its degree of processing urgency and transmitted according to the priority level. Therefore, the throughput of an HS-DSCH related with the control information of the HS-SCCH increases. Consequently, the HS-DSCH signal is processed rapidly, which leads to rapid user data reception. Thus the whole HSDPA communication system performance is improved.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A control channel transmitting apparatus in a communication system including a shared channel and a control channel, the shared channel being shared among a plurality of UEs (User Equipments) and spread with a plurality of channelization codes, and the control channel transmitting control information related to the shared channel to enable the UEs to receive the shared channel, the apparatus comprising:

a controller for prioritizing the control information according to a processing urgency degree of the control information;

a first control information generator for generating high-priority control information which includes information about a channelization code to spread the shared channel with, and a modulation scheme applied to the shared channel;

a second control information generator for generating low-priority control information;

a first encoder for encoding the high-priority control information in a predetermined first encoding method;

a second encoder for encoding the low-priority control information in a predetermined second encoding method different from the first encoding method; and a multiplexer (MUX) for multiplexing the high-priority control information and the low-priority control information to a control channel signal such that the high-priority control information precedes the low-priority control information.

2. The control channel transmitting apparatus of claim 1, wherein the low-priority control information includes information about a new data indicator indicating whether user data is initially transmitted or retransmitted on the shared channel, a transport block set size of a transport channel mapped to the shared channel, redundancy version information indicating a redundancy bit combination used for retransmitted user data if the user data is retransmitted, and an HARQ (Hybrid Automatic Repeat reQuest) process ID (Identifier) indicating a number of a logical channel that transmits the user data.

3. The control channel transmitting apparatus of claim 2, wherein when the user data is initially transmitted, the controller controls the redundancy version information not to be generated, and when the user data is retransmitted, the controller controls the transport block set size information not to be generated.

4. The control channel transmitting apparatus of claim 1, wherein the high-priority control information includes information about a channelization code to spread the shared channel with, and a new data indicator indicating whether user data is initially transmitted or retransmitted on the shared channel.

5. The control channel transmitting apparatus of claim 1, wherein the low-priority control information includes information about a modulation scheme applied to the shared channel, a transport block set size of a transport channel mapped to the shared channel, redundancy version information indicating a redundancy bit combination used for retransmitted user data if the user data is retransmitted, and an HARQ Process ID indicating a number of a logical channel that transmits the user data.

6. The control channel transmitting apparatus of claim 5, wherein when the user data is initially transmitted, the controller controls the redundancy version information not to be generated, and when the user data is retransmitted, the controller controls the transport block set size information not to be generated.

7. The control channel transmitting apparatus of claim 1 wherein the high-priority control information includes information about a channelization code to spread the shared channel with, a modulation scheme applied to the shared channel, and a new data indicator indicating whether user data is initially transmitted or retransmitted on the shared channel.

8. The control channel transmitting apparatus of claim 1, wherein the low-priority control information includes information about a transport block set size of a transport channel mapped to the shared channel, redundancy version information indicating a redundancy bit combination used for retransmitted user data if the user data is retransmitted, and an HARQ Process ID indicating a number of a logical channel that transmits the user data.

9. The control channel transmitting apparatus of claim 8, wherein when the user data is initially transmitted, the controller controls the redundancy version information not to be generated, and when the user data is retransmitted, the controller controls the transport block set size information not to be generated.

10. A control channel receiving apparatus in a communication system including a shared channel and a control channel, the shared channel being shared among a plurality of UEs (User Equipments) and spread with a plurality of channelization codes, and the control channel transmitting control information related to the shared channel to enable the UEs to receive the shared channel, the apparatus comprising:

a demultiplexer (DEMUX) for receiving a control channel signal and demultiplexing the control channel signal into high-priority control information and low-priority control information according to processing urgency degrees of the control information under a predetermined control;

a first decoder for decoding the high-priority control information in a predetermined first decoding method;

a second decoder for decoding the low-priority control information in a predetermined second decoding method different from the first decoding method; and a controller for controlling the high-priority control information to be demodulated before the low-priority control information, wherein the high-priority control information includes information about a channelization code to spread the shared channel with, and a modulation scheme applied to the shared channel.

11. The control channel receiving apparatus of claim 10, wherein the low-priority control information includes information about a new data indicator indicating whether user data is initially transmitted or retransmitted on the shared channel, a transport block set size of a transport channel mapped to the shared channel, redundancy version information indicating a redundancy bit combination used for retransmitted user data if the user data is retransmitted, and an HARQ (Hybrid Automatic Repeat reQuest) process ID (Identifier) indicating a number of a logical channel that transmits the user data.

12. The control channel receiving apparatus of claim 11, wherein when the user data is initial transmission data, the controller determines that the low-priority control information includes the transport block set size information.

13. The control channel receiving apparatus of claim 10, wherein the high-priority control information includes information about a channelization code to spread the shared channel with, and a new data indicator indicating whether user data is initially transmitted or retransmitted on the shared channel.

14. The control channel receiving apparatus of claim 10, wherein the low-priority control information includes information about a modulation scheme applied to the shared channel, a transport block set size of a transport channel mapped to the shared channel, redundancy version information indicating a redundancy bit combination used for retransmitted user data if the user data is retransmitted, and an HARQ Process ID indicating a number of a logical channel that transmits the user data.

15. The control channel receiving apparatus of claim 14, wherein when the user data is initial transmission data, the controller determines that the low-priority control information includes the transport block set size information.

16. The control channel receiving apparatus of claim 10, wherein the high-priority control information includes information about a channelization code to spread the shared channel with, a modulation scheme applied to the shared channel, and a new data indicator indicating whether user data is initially transmitted or retransmitted on the shared channel.

17. The control channel receiving apparatus of claim 10, wherein the low-priority control information includes information about a transport block set size of a transport channel mapped to the shared channel, redundancy version information indicating a redundancy bit combination used for retransmitted user data if the user data is retransmitted, and an HARQ Process ID indicating a number of a logical channel that transmits the user data.

18. The control channel receiving apparatus of claim 17, wherein when the user data is initial transmission data, the controller determines that the low-priority control information includes the transport block set size information.

19. A control channel transmitting method in a communication system including a shared channel and a control channel, the shared channel being shared among a plurality of UEs (User Equipments) and spread with a plurality of channelization codes, and the control channel transmitting control information related to the shared channel to enable the UEs to receive the shared channel, the method comprising the steps of:
   prioritizing the control information according to a processing urgency degree of the control information;
   generating high-priority control information including information about a channelization code to spread the shared channel with, and a modulation scheme applied to the shared channel, and encoding the high-priority control information in a predetermined first encoding method;
   generating low-priority control information and encoding the low-priority control information in a predetermined second encoding method different from the first encoding method; and
   multiplexing the high-priority control information and the low-priority control information to a control channel signal such that the high-priority control information precedes the low-priority control information.

20. The control channel transmitting method of claim 19, wherein the low-priority control information includes information about a new data indicator indicating whether user data is initially transmitted or retransmitted on the shared channel, a transport block set size of a transport channel mapped to the shared channel, redundancy version information indicating a redundancy bit combination used for retransmitted user data if the user data is retransmitted, and an HARQ (Hybrid Automatic Repeat reQuest) process ID (Identifier) indicating a number of a logical channel that transmits the user data.

21. The control channel transmitting method of claim 20, further comprising the step of controlling the redundancy version information not to be generated when the user data is initially transmitted, and controlling the transport block set size information not to be generated when the user data is retransmitted.

22. The control channel transmitting method of claim 19, wherein the high-priority control information includes information about a channelization code to spread the shared channel with, and a new data indicator indicating whether user data is initially transmitted or retransmitted on the shared channel.

23. The control channel transmitting method of claim 19, wherein the low-priority control information includes information about a modulation scheme applied to the shared channel, a transport block set size of a transport channel mapped to the shared channel, redundancy version information indicating a redundancy bit combination used for retransmitted user data if the user data is retransmitted, and an HARQ Process ID indicating a number of a logical channel that transmits the user data.

24. The control channel transmitting method of claim 23, further comprising the step of controlling the redundancy version information not to be generated when the user data is initially transmitted, and controlling the transport block set size information not to be generated when the user data is retransmitted.

25. The control channel transmitting method of claim 19, wherein the high-priority control information includes information about a channelization code to spread the shared channel with, a modulation scheme applied to the shared channel, and a new data indicator indicating whether user data is initially transmitted or retransmitted on the shared channel.

26. The control channel transmitting method of claim 19, wherein the low-priority control information includes information about a transport block set size of a transport channel mapped to the shared channel, redundancy version information indicating a redundancy bit combination used for retransmitted user data if the user data is retransmitted, and an HARQ Process ID indicating a number of a logical channel that transmits the user data.

27. The control channel transmitting method of claim 26, further comprising the step of controlling the redundancy version information not to be generated when the user data is initially transmitted, and controlling the transport block set size information not to be generated when the user data is retransmitted.

28. A control channel receiving method in a communication system including a shared channel and a control channel, the shared channel being shared among a plurality of UEs (User Equipments) and spread with a plurality of channelization codes, and the control channel transmitting control information related to the shared channel to enable the UEs to receive the shared channel, the method comprising the steps of:
   receiving a control channel signal and demultiplexing the control channel signal into high-priority control information and low-priority control information according to processing urgency degrees of the control information under a predetermined control;
   decoding the high-priority control information in a predetermined first decoding method; and
   decoding the low-priority control information in a predetermined second decoding method different from the first decoding method after decoding the high-priority control information,
   wherein the high-priority control information includes information about a channelization code to spread the shared channel with, and a modulation scheme applied to the shared channel.

29. The control channel receiving method of claim 28 wherein the low-priority control information includes information about a new data indicator indicating whether user data is initially transmitted or retransmitted on the shared channel, a transport block set size of a transport channel mapped to the shared channel, redundancy version information indicating a redundancy bit combination used for retransmitted user data if the user data is retransmitted, and an HARQ (Hybrid Automatic Repeat reQuest) process ID (Identifier) indicating a number of a logical channel that transmits the user data.

30. The control channel receiving method of claim 29, further comprising the step of determining that the low-priority control information includes the transport block set size information when the user data is initial transmission data.

31. The control channel receiving method of claim 28, wherein the high-priority control information includes information about a channelization code to spread the shared channel with, and a new data indicator indicating whether user data is initially transmitted or retransmitted on the shared channel.

32. The control channel receiving method of claim 28, wherein the low-priority control information includes information about a modulation scheme applied to the shared channel, a transport block set size of a transport channel mapped to the shared channel, redundancy version information indicating a redundancy bit combination used for retransmitted user data if the user data is retransmitted, and an HARQ Process ID indicating a number of a logical channel that transmits the user data.

33. The control channel receiving method of claim 32, further comprising the step of determining that the low-priority control information includes the transport block set size information when the user data is initial transmission data.

34. The control channel receiving method of claim 28, wherein the high-priority control information includes information about a channelization code to spread the shared channel with, a modulation scheme applied to the shared channel, and a new data indicator indicating whether user data is initially transmitted or retransmitted on the shared channel.

35. The control channel receiving method of claim 28, wherein the low-priority control information includes information about a transport block set size of a transport channel mapped to the shared channel, redundancy version information indicating a redundancy bit combination used for retransmitted user data if the user data is retransmitted, and an HARQ Process ID indicating a number of a logical channel that transmits the user data.

36. The control channel receiving method of claim 35, further comprising the step of determining that the low-priority control information includes the transport block set size information when the user data is initial transmission data.

* * * * *